United States Patent
Freiborg

(10) Patent No.: US 10,180,003 B2
(45) Date of Patent: Jan. 15, 2019

(54) LAMINATED ROOF SHINGLE

(71) Applicant: Mark Freiborg, Long Beach, CA (US)

(72) Inventor: Mark Freiborg, Long Beach, CA (US)

( * ) Notice: Subject to any disclaimer, the term of this patent is extended or adjusted under 35 U.S.C. 154(b) by 0 days.

(21) Appl. No.: 15/627,308

(22) Filed: Jun. 19, 2017

(65) Prior Publication Data

US 2018/0363301 A1    Dec. 20, 2018

(51) Int. Cl.
| | |
|---|---|
| *E04D 1/26* | (2006.01) |
| *E04D 1/28* | (2006.01) |
| *B32B 38/00* | (2006.01) |
| *B32B 37/24* | (2006.01) |
| *B26D 3/10* | (2006.01) |
| *B32B 5/16* | (2006.01) |
| *B32B 9/00* | (2006.01) |
| *B32B 11/12* | (2006.01) |
| *E04D 1/00* | (2006.01) |

(52) U.S. Cl.
CPC .............. *E04D 1/26* (2013.01); *B26D 3/10* (2013.01); *B32B 5/16* (2013.01); *B32B 9/002* (2013.01); *B32B 11/12* (2013.01); *B32B 37/24* (2013.01); *B32B 38/0004* (2013.01); *E04D 1/28* (2013.01); *B32B 2307/404* (2013.01); *B32B 2419/06* (2013.01); *E04D 2001/005* (2013.01)

(58) Field of Classification Search
CPC ....... E04D 1/26; E04D 1/28; E04D 2001/005; B32B 11/12; B32B 38/0004; B32B 37/24; B32B 37/14; B32B 9/002; B32B 5/16; B32B 2419/06; B32B 2307/404; B26D 3/10
See application file for complete search history.

(56) References Cited

U.S. PATENT DOCUMENTS

| | | | |
|---|---|---|---|
| 3,613,328 A | 10/1971 | Morgan, Jr. et al. | |
| 3,624,975 A * | 12/1971 | Morgan et al. | E04D 1/26 52/105 |
| 4,233,100 A | 11/1980 | Cunningham | |
| 4,274,243 A | 6/1981 | Corbin | |
| 4,333,279 A * | 6/1982 | Corbin | E04D 1/26 52/105 |
| 4,527,374 A * | 7/1985 | Corbin | E04D 1/26 52/557 |
| 4,717,614 A | 1/1988 | Bondoc | |
| D344,144 S | 2/1994 | Weaver | |

(Continued)

OTHER PUBLICATIONS

U.S. Appl. No. 15/925,238, Non Final Action dated May 24, 2018.

*Primary Examiner* — Rodney Mintz

(57) ABSTRACT

A laminated roofing shingle includes a base layer attached to an overlay layer. The overlay layer provides tabs extending from a long edge. The tabs have a width that is exposed when the shingle is installed. The exposed surface of the base layer is covered by mineral granules from a first color group for a first distance from the long edge. The remainder of the exposed surface of the base layer is covered by mineral granules from a second color group. The exposed surface of the overlay layer is covered by mineral granules from a third color group for the first distance from the long edge. The remainder of the exposed surface of the overlay layer is covered by mineral granules from the second color group. The mineral granules may be applied to a continuous sheet in color lanes from which the base and overlay sheets may be cut.

16 Claims, 3 Drawing Sheets

(56) References Cited

U.S. PATENT DOCUMENTS

| | | | | |
|---|---|---|---|---|
| 5,369,929 | A | 12/1994 | Weaver | |
| 5,426,902 | A | 6/1995 | Stahl | |
| 5,611,186 | A | 3/1997 | Weaver | |
| 5,666,776 | A * | 9/1997 | Weaver | E04D 1/26 52/314 |
| 6,010,589 | A | 1/2000 | Stahl | |
| 6,014,847 | A | 1/2000 | Phillips | |
| 6,174,403 | B1 * | 1/2001 | Steiner, Jr. | B32B 37/20 156/260 |
| 6,190,754 | B1 | 2/2001 | Bondoc | |
| 6,220,329 | B1 | 4/2001 | King | |
| 6,289,648 | B1 | 9/2001 | Freshwater | |
| 6,305,138 | B1 | 10/2001 | Stahl | |
| 6,361,851 | B1 * | 3/2002 | Sieling | B32B 3/02 428/141 |
| 6,457,290 | B1 | 10/2002 | Elliott | |
| D466,629 | S | 12/2002 | Phillips | |
| 6,708,456 | B2 | 3/2004 | Kiik | |
| 6,933,037 | B2 | 8/2005 | McCumber | |
| 7,240,462 | B2 | 7/2007 | Elliott et al. | |
| 8,430,983 | B2 | 4/2013 | Vermilion | |
| 8,438,812 | B2 * | 5/2013 | King | E04D 1/26 52/314 |
| 8,623,164 | B2 | 1/2014 | Belt | |
| 8,776,471 | B2 * | 7/2014 | Jenkins | E04D 1/26 428/141 |
| 8,789,332 | B1 * | 7/2014 | Halliley | B65D 83/0894 206/323 |
| 8,793,955 | B2 | 8/2014 | Ray | |
| 9,140,012 | B1 | 9/2015 | Leitch | |
| D750,810 | S | 3/2016 | Buzza | |
| 9,464,439 | B2 | 10/2016 | Buzza | |
| 9,739,062 | B2 | 8/2017 | Leitch | |
| 2003/0040241 | A1 | 2/2003 | Kiik | |
| 2003/0163964 | A1 | 9/2003 | Elliott | |
| 2004/0103611 | A1 * | 6/2004 | King | E04D 1/26 52/554 |
| 2004/0107664 | A1 | 6/2004 | Rodrigues | |
| 2004/0123537 | A1 | 7/2004 | Elliott | |
| 2004/0123543 | A1 | 7/2004 | Elliott | |
| 2005/0193673 | A1 | 9/2005 | Rodrigues | |
| 2006/0059834 | A1 * | 3/2006 | Elliott | E04D 1/26 52/557 |
| 2006/0179767 | A1 * | 8/2006 | Miller | B32B 3/08 52/555 |
| 2007/0042158 | A1 | 2/2007 | Belt | |
| 2007/0068108 | A1 | 3/2007 | Kiik | |
| 2008/0005995 | A1 | 1/2008 | Elliott | |
| 2011/0197534 | A1 | 8/2011 | Belt | |
| 2011/0209428 | A1 * | 9/2011 | Elliott | E04D 1/26 52/526 |
| 2011/0283646 | A1 | 11/2011 | Vermilion | |
| 2012/0258282 | A1 | 10/2012 | Hammond | |
| 2012/0260597 | A1 | 10/2012 | Jenkins | |
| 2013/0025224 | A1 | 1/2013 | Vermilion | |
| 2013/0025226 | A1 | 1/2013 | Jenkins | |
| 2013/0298490 | A1 * | 11/2013 | Jenkins | E04D 1/26 52/557 |
| 2014/0245690 | A1 | 9/2014 | Stahl | |
| 2014/0260047 | A1 * | 9/2014 | Jenkins | E04D 1/26 52/518 |
| 2015/0315789 | A1 | 11/2015 | Buzza | |
| 2016/0177569 | A1 | 6/2016 | Leitch | |
| 2016/0340903 | A1 * | 11/2016 | Folkersen | E04D 1/26 |
| 2017/0175393 | A1 | 6/2017 | Leitch | |
| 2017/0321423 | A1 * | 11/2017 | Aschenbeck | E04D 1/36 |

\* cited by examiner

LAMINATED ROOF SHINGLE

BACKGROUND

Field

Embodiments of the invention relate to the field of roofing shingles; and more specifically, to laminated asphalt roofing shingles.

Background

Asphalt shingles are a commonly used roofing material. Such shingles may be manufactured as a laminated shingle to provide improved durability and appearance. A strip shingle in laminated form may include a base layer of composite roofing sheet material that is the full length dimension of the strip shingle and with no tab cut-outs. Laminated to this base layer is an overlay layer of similar composite roofing sheet material of the same length as the base. The overlay layer is adhesively laminated to the base layer, preferably with roofing asphalt.

The overlay layer may be of a different width than the base layer and have multiple, widely spaced cut-out tabs of rectangular or approximately rectangular shape, of the same or differing widths and the same or differing lengths. The pattern of tabs may be regular or randomized to avoid a discernable pattern when many shingles are laid as a roof covering. The pattern of tabs is sometimes referred to as a "dragon tooth" pattern. The surface areas of the base layer exposed in the spaces between the tabs of the overlay layer become tab-simulating areas of the laminated shingle when it is laid on the roof.

The composite roofing sheet material has an exposed surface that is coated with a mineral surface, e.g. crushed rock. The mineral surface provides a durable roofing surface that can be provided in a variety of colors, including variegated colors. The base layer and the overlay layer are generally made from sheet materials of different colors. This provides a contrast between the tabs of the overlay layer and the tab-simulating areas of the base layer that are exposed through the cut-outs of the overlay layer.

Even though laminated asphalt shingles offer significant cost, service life, and flammability advantages over wood shingles, wood shingles are still often preferred due to the pleasing aesthetic appearance of a wood shingled roof. An important aesthetic advantage of wood shingles is their greater thickness as compared to composite shingles. The thickness of wood shingles results in a more pleasing, layered look for the finished roof.

It would be desirable to provide a laminated asphalt shingle that allows colored granules to be applied to the composite roofing sheet material in a way that improves the aesthetic appearance of the laminated asphalt shingle.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

Figure 1:
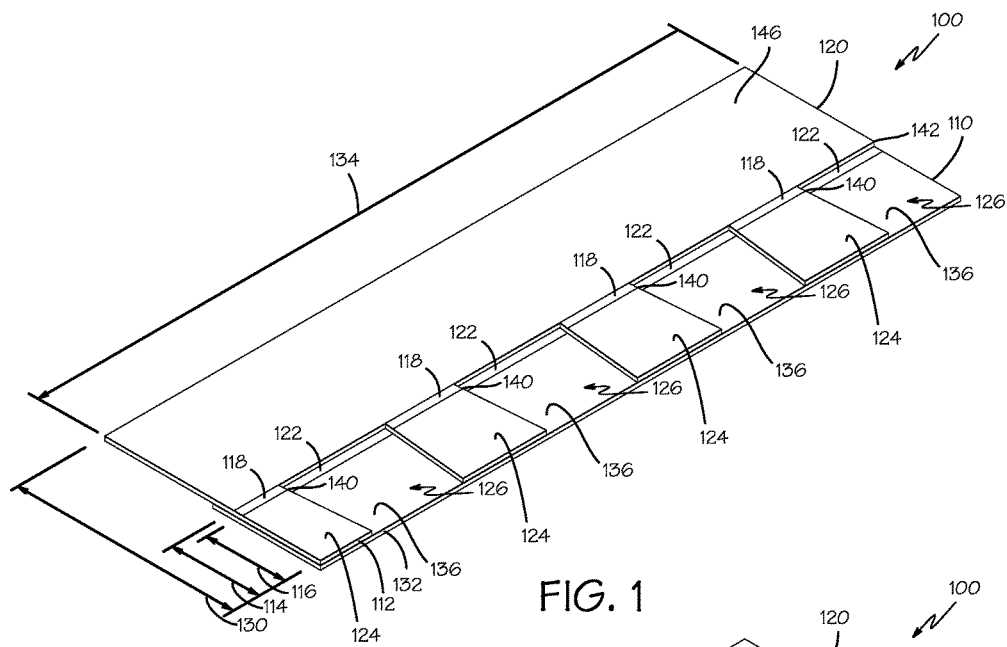
FIG. 1 is a pictorial view of an illustrative laminated composition shingle.

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, and operational changes may be made without departing from the spirit and scope of the present disclosure. The following detailed description is not to be taken in a limiting sense, and the scope of the embodiments of the present invention is defined only by the claims of the issued patent.

Dimensional information in the following description should be understood as nominal dimensions that are intended to encompass variations in dimensions that normally occur in the commercial production of laminated asphalt composition roofing shingles. Terms such as "approximately," "about," and "substantially" may be used to qualify dimensional information in the following description but such qualifications are intended merely to reinforce that the dimensions are nominal dimensions and not to differentiate qualified dimensions from unqualified dimensions. It will be recognized that roofing shingles are not precision parts and that substantial variations in dimensions can occur between nominally identical shingles without affecting their function or usability.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 2:
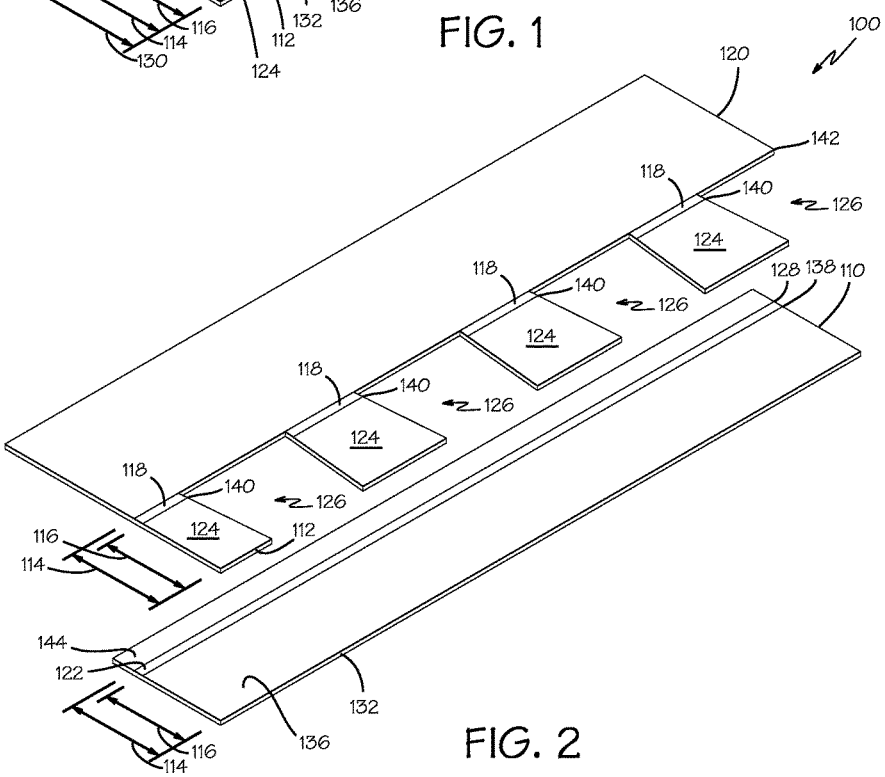
FIG. 2 is an exploded view of the laminated composition shingle shown in FIG. 1.

FIG. 1 is a pictorial view of an exemplary laminated asphalt composition roofing shingle 100 that embodies the invention. FIG. 2 is an exploded view of the laminated asphalt composition roofing shingle 100 of FIG. 1 that shows the structure of the shingle.

The laminated composition shingle 100 shown in FIG. 1 includes a first, base sheet 110 having a mineral granule surface and a rectangular shape without tab cut-outs. A second, overlay sheet 120 having a mineral granule surface and a plain surface opposite the mineral granule surface is attached to the first sheet 110 to form the shingle 100. The plain surface of the second sheet 120 is attached to the first mineral granule surface of the first sheet 110. The second sheet 120 has a number of tabs 124 defined by tab cut-outs 126.

The longer edge 112 of the second sheet having the tab cut-outs is adjacent to one of the longer edges 132 of the first sheet. In the shingle 100 shown in FIG. 1, the longer edge 112 of the second sheet 120 is aligned with the longer edge 132 of the first sheet 110. The adjacent longer edges are the edges that will be fully exposed when the shingle is installed as part of a complete shingle roof.

In other shingles, the longer edge of the second sheet may be slightly offset from the longer edge of the first sheet for the purpose of creating certain decorative appearances. In still other shingles, the longer edge of either or both of the sheets may not be a straight line.

The dimensions of most asphalt composition roofing shingles are standardized either to a width 130 of 12" by a length 134 of 36" or to a width of 0.337 m by a length of 1 m (13¼"×39⅜"). If the longer edge of the shingle is not a straight line, the standardized dimensions will generally be for the largest rectangle that is fully covered by the shingle.

Laminated composition roofing shingles may have a portion that is a double thickness and a remaining portion that is a single thickness. The construction of most laminated composition roofing shingles is standardized such that the single thickness portion is slightly wider than the double thickness portion. Pairs of shingles can thus be stacked with a double thickness portion against a single thickness portion to produce a package of uniform thickness. Laminated composition roofing shingles that embody the invention can be made according to these standards. While laminated composition roofing shingles made from two sheets of material are shown and described, it will be appreciated that additional sheets may be used to form a laminated shingle that embodies the invention.

Figure 3:
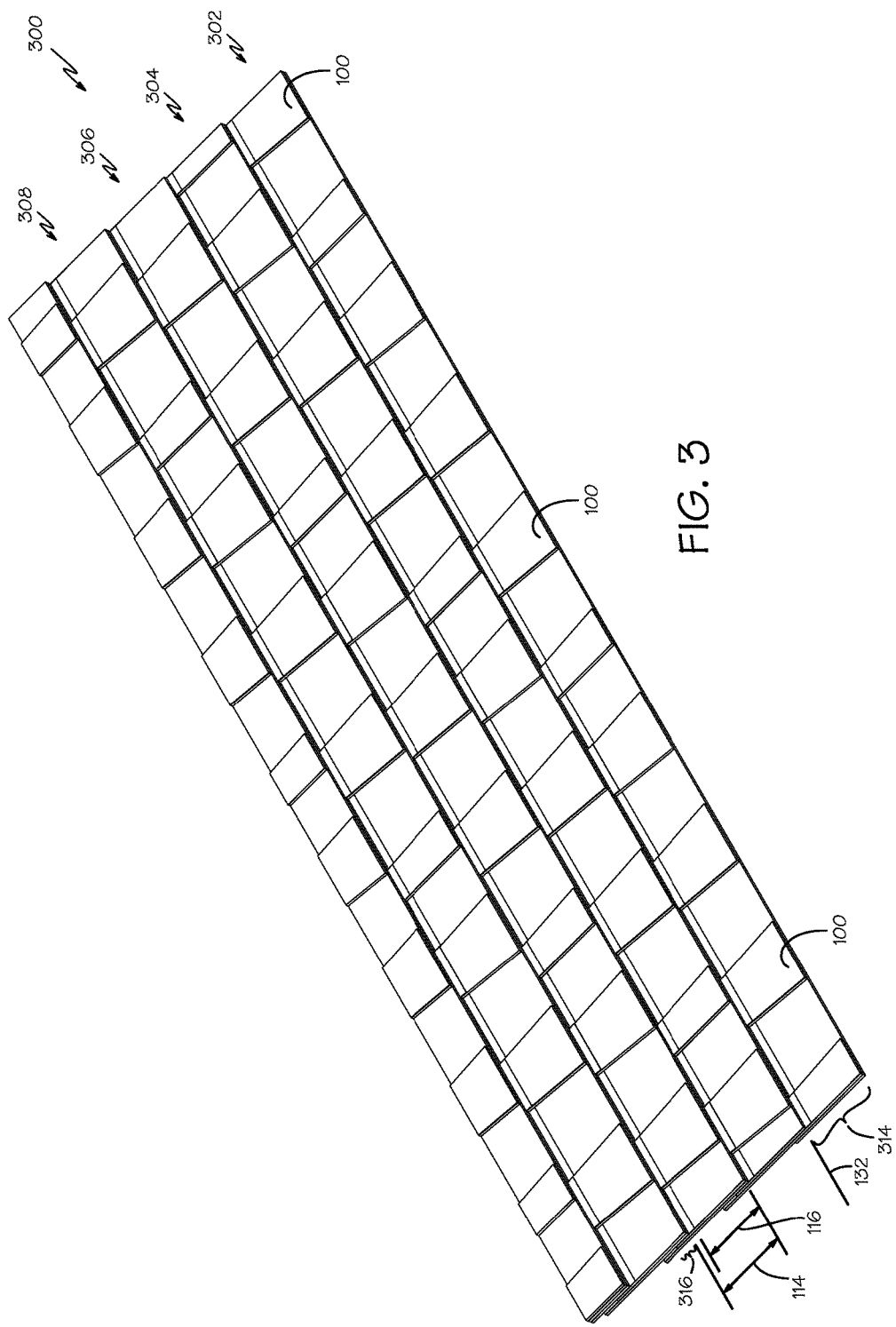
FIG. 3 is a pictorial view of a portion of a roof to which laminated composition shingles of the type shown in FIGS. 1 and 3 have been applied.

FIG. 3 is a pictorial view of a portion of a roof 300 covered with laminated asphalt composition roofing shingles 100 of the type shown in FIG. 1. Laminated composition shingles 100 are applied to a roof by laying rows or courses 302, 304, 306, 308 of shingles laid end to end with the lower edge 132 of the shingles parallel to a lower edge or eave of the roof. Successive courses of shingles are laid with a portion 314 of the preceding course 302 of shingles left exposed below the lower edge 132 of the succeeding course 304. Generally, somewhat less than half of each shingle is left exposed to provide a water-tight roof by providing a headlap, as explained below.

A portion of the shingles 100 in one course 302 immediately above the exposed portion 314 will be covered both by the succeeding course 304 and by the next succeeding course 306. Thus, there will be three shingles layered together immediately above the exposed portion of a shingle. This portion of the shingle is called the headlap 316. It is desirable to provide a 2" (51 mm) headlap. The width of the headlap is the width 130 of the shingle less twice the exposure 114. Laying a 12"×36" laminated composition shingles with 5" exposure of the tabs provides a 2" headlap, 12"−(2×5"). Laying a 0.337 m×1 m (13¼"×39⅜") laminated composition shingle with 0.143 m (5⅝") exposure of the tabs also provides a 51 mm (2") headlap, 0.337 m−(2× 0.143 m).

The exposed portion of the laminated composition shingle generally has a width that is between 40% and 45% of the overall width of the laminated composition shingle. Thus the exposed portion of 12"×36" laminated composition shingles is generally between 4.8" (0.40×12") and 5.4" (0.45×12"). The exposed portion of 0.337 m×1 m (13¼"×39⅜") laminated composition shingles is generally between 0.135 m (5.30") and 0.152 m (5.96").

The width 114 of the cut-out tabs 126 in the overlay layer 120 of a laminated composition shingle 100 that embodies the invention is the same as the exposure 114 of the shingle. The cut-out tabs 126 provide a guide for placing succeeding courses to provide the correct exposure of the shingle.

Referring again to FIGS. 1 and 2, a first layer of colored mineral granules from a first color group is adhered to the top surface of the first sheet 110 in a first area 136 between the longer, first edge 132 and a first boundary 138 that is generally parallel to and at a first distance 116 from the first edge. The first color group may be relatively uniform in color or may provide a color gradation. Color gradations, if used, are such that the area covered with a gradated color group provides a visual impression of a single colored area.

A second layer of colored mineral granules from a second color group is adhered to the top surface of the first sheet 110 in a second area 122 between the first boundary 138 and a second boundary 128 generally parallel to and at a second distance 114 from the first edge 132. The second color group is visually distinct from the first color group. For example, the second color group may be darker than the first color group, such that it has the appearance of a shadow. The second color group may be relatively uniform in color.

A third layer of colored mineral granules from a third color group is adhered to the top surface of the second sheet 120 on the plurality of tabs 124 in a third area 124 between the second edge 112 and a third boundary 140 generally parallel to and at the first distance 116 from the second edge 112. The third color group is visually distinct from the first and second color groups. For example, the third color group may be lighter than the first and second color groups. The third color group may be relatively uniform in color or may provide a color gradation.

A fourth layer of colored mineral granules from the second color group adhered to the top surface of the second sheet 120 on the plurality of tabs 124 in a fourth area 118 between the third boundary 140 and a fourth boundary 142 generally parallel to and at the second distance 114 from the second edge 112. It will be appreciated that the second boundary 128 and the fourth boundary 142 are adjacent areas 144, 146 that are not visible when the shingle is installed. The non-visible areas 144, 146 may be covered with mineral granules from the second color group or of another color, such as reclaimed mineral granules from various color groups.

The first boundary 138 and the third boundary 140 are both at the first distance 116 from the first edge 132 and the second edge 112 respectively. If the longer, first edge 132 of the first sheet 110 is aligned with the longer, second edge 112 of the second sheet 120 when the top surface of the first sheet is attached to the bottom surface of the second sheet to form the laminated roofing shingle 100, the fourth layer of colored mineral granules in the fourth area 118 on the plurality of tabs 124 of the second sheet 120 will be aligned with the second layer of colored mineral granules in the second area 122 of the first sheet 110. This provides a visually continuous generally rectangular area 118, 122 just below the longer, exposed edge of the succeeding course of shingles. By providing two relatively straight edges along the length of the shingle as boundaries for the areas of the shingles that are covered with colored mineral granules from the second color group, shingles that embody the invention provide an opportunity to select colors for the mineral granule surfaces that provide an illusion of a greater thickness for the installed shingles.

Laminated roofing shingles 100 are typically fabricated in a continuous process in which a roll of sheet material is fed into a series of processing stations that perform operations including applying the colored mineral granules to the sheet, cutting the base and overlay layers from the sheet, and attaching the base layer to the overlay layer.

Figure 4:
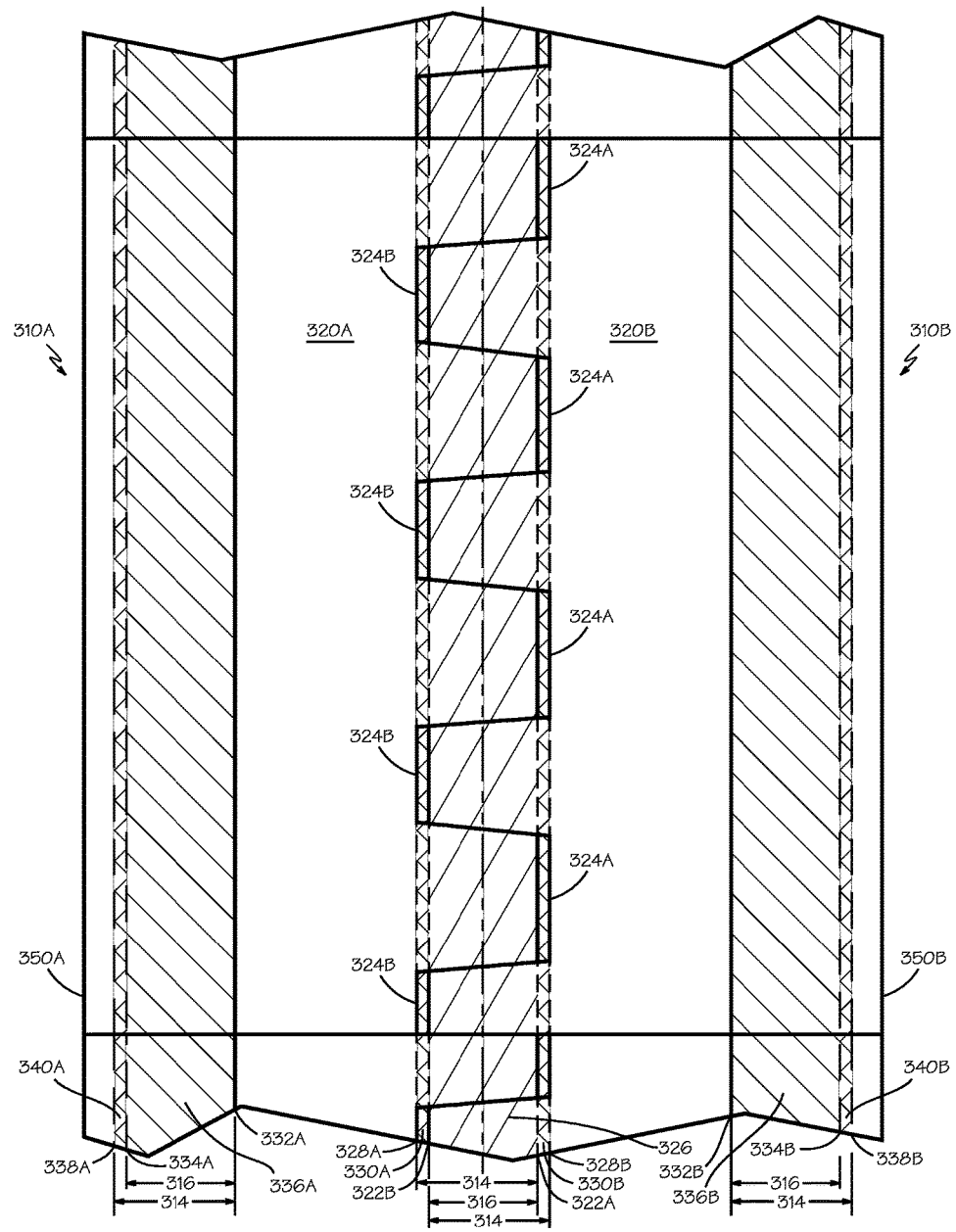
FIG. 4 is a plan view of a portion of a continuous sheet of material illustrating an exemplary method of forming the laminated composition shingle shown in FIG. 1.

FIG. 4 is a plan view of a portion of a roll of sheet material that illustrates the formation of two base layers and two overlay layers that would be used to assemble two laminated roofing shingles 100 of the type shown in FIG. 1. A top surface of the sheet material is coated with a layer of colored mineral granules such as ceramic coated stone granules to provide the desired colored portions on the exposed visible weather surfaces of a shingle. Portions of the top surface that will not be visible and not directly exposed to the weather may be coated with mineral granules that are uncolored or with reclaimed colored mineral granules that may be a mixture of colors. Generally the entire width of the sheet material will be coated with a layer of mineral granules.

An adhesive material, such as asphalt, may be applied to the sheet material. The mineral granules may then be deposited on the sheet material from a hopper that includes a storage bin divided into compartments by a plurality of partitions. This transfer of mineral granules is sometimes referred to as a "color drop." A roller may apply pressure to the mineral granules to firmly adhere them to the sheet material. This process results in the colored mineral granules being applied in continuous color lanes of a given width that extends along the length of the sheet material.

In FIG. 4, the illustrated sheet material has a top surface that includes two first color lanes 336*a*, 336*b* that are coated with colored mineral granules from a first color group. Each first color lane 336*a*, 336*b* is between a first boundary 332*a*, 332*b* and a second boundary 334*a*, 334*b* spaced apart by a first distance 316. The sheet has two parallel edges 350*a*, 350*b* and the first boundaries 332*a*, 332*b* and second boundaries 334*a*, 334*b* are generally parallel to the edges. It will be appreciated that the process of applying mineral granules is not precise and the position of the boundaries of the color lanes will vary somewhat along the length of the sheet due to normal process variations. The colored mineral granules from the first color group may be relatively uniform in color or they may provide a color gradation where the color varies within an area without providing an sub-area of a distinctly different color.

The top surface of the sheet material further includes two second color lanes 340*a*, 340*b* that are coated with colored mineral granules from a second color group. Each second color lane 340*a*, 340*b* is between the second boundary 334*a*, 334*b* and a third boundary 338*a*, 338*b*. The third boundary 338*a*, 338*b* is spaced apart from the first boundary 332*a*, 332*b* by a second distance 314 and is generally parallel to the edges 350*a*, 350*b* of the sheet. The first distance 316 is between 90% and 97% of the second distance 314. Thus the second color lanes 340*a*, 340*b* are relatively narrow compared to the first color lanes 346*a*, 346*b*. The colored mineral granules from the second color group will usually be relatively uniform in color because of the small width of the second color lanes 340*a*, 340*b*.

The top surface of the sheet material will generally be coated with mineral granules between the third boundary 338*a*, 338*b* and the edge 350*a*, 350*b* of the sheet. Since this surface is not visible in an installed shingle 100, the mineral granules may be from the second color group, uncolored, or of mixed colors taken from reclaimed mineral granules. The third color group is visually distinct from the first and second color groups.

The top surface of the sheet material further includes a third color lane 326 that is coated with colored mineral granules from a third color group. The third color lane 326 is between a fourth boundary 322*a* and a fifth boundary 322*b* spaced apart by the first distance 316. The fourth boundary 322*a* and the fifth boundary 322*b* are generally parallel to the edges 350*a*, 350*b* of the sheet. The colored mineral granules from the third color group are visually distinct from the first and second color groups and may be relatively uniform in color or they may provide a color gradation where the color varies within an area without providing an sub-area of a distinctly different color. The mineral granules from the second color group may be darker in color than mineral granules from the first color group and the third color group. The mineral granules from the first color group may be darker in color than mineral granules from the third color group.

The top surface of the sheet material further includes two fourth color lanes 330*a*, 330*b* that are coated with colored mineral granules from the second color group. Each fourth color lane 330*a*, 330*b* is between one of the fourth boundary 322*a* and the fifth boundary 322*b* and a sixth boundary 328*a*, 328*b*. The sixth boundaries 328*a*, 328*b* are spaced apart from the fourth boundary 322*a* and the fifth boundary 322*b* respectively by the second distance 314. The two fourth color lanes 330*a*, 330*b* are adjacent opposite sides of the third color lane 326.

A base layer 310*a* is cut from the sheet. The base layer 310*a* has a first edge at the first boundary 332*a*. The base layer 310*a* includes the first color lane 336*a* and the second color lane 340*a*.

An overlay layer 320*a* is cut from the sheet. The overlay layer 320*a* includes the third color lane 326 and the fourth color lane 330*a*. The overlay layer 320*a* has a second edge at the fourth boundary 322*a*. The overlay layer provides a plurality of tabs extending from the fourth boundary 322*a* to the sixth boundary 328*a*. The plurality of tabs are spaced apart to define a plurality of openings between the plurality of tabs. The tabs, and particularly the depth of the opening between the tabs at the sixth boundary 328*a*, define a portion of the laminated roofing shingle that is exposed when installed.

The top surface of the base layer 310*a* is attached to the bottom surface of the overlay layer 320*a* to form the laminated roofing shingle. The first edge at the first boundary 332*a* of the base layer 310*a* is generally aligned with the second edge at the fourth boundary 322*a* of the overlay layer 320*a*. Portions of the first color lane 336*a* and the second color lane 340*a* on the base layer 310*a* are exposed in the plurality of openings between the plurality of tabs of the overlay layer 320a. The second color lane 340a on the base layer 310a and the fourth color lane 330a on the overlay layer 320a have the same color mineral granules and are generally aligned and, thus, provide a visual impression of a continuous line of a generally uniform width along the length of the laminated roofing shingle below the exposed edges other laminated roofing shingles installed on top of the laminated roofing shingle.

As shown in FIG. 4, a second overlay layer 320b may be cut from the sheet with the plurality of tabs of the second overlay layer 320b interlocking with the plurality of tabs of the first overlay layer 320a. It is important to note that, unlike conventionally formed laminated roofing shingles, the second edge at the fourth boundary 322a of the first overlay layer 320a is spaced apart from the sixth boundary 328b at the depth of the opening between the tabs of the second overlay layer 320b. The second edge at the fifth boundary 322b of the second overlay layer 320b is similarly spaced apart from the sixth boundary 328a of the first overlay layer 320a. This creates scrap pieces 324a, 324b that are not used in forming the laminated roofing shingle. The scrap pieces 324a, 324b cut away portions of the fourth color lane 330a, 330b that would otherwise be visible on the tab portions of the overlay layer 320a, 320b adjacent to the exposed edge of the laminated roofing shingle. Providing a laminated roofing shingle in which the mineral granules from the second color group are exposed along the length of the laminated roofing shingle below the exposed edges other laminated roofing shingles installed on top of the laminated roofing shingle but not at the edge of the shingles installed on top provides an opportunity to create laminated roofing shingles with a different installed appearance from conventional laminated roofing shingles produced by known methods.

It is important to note that color lanes of the present invention may be placed on shingles using various procedures and various types of materials. The present invention is not limited to shingles formed by the process shown and described. Although the present invention and its advantages have been described in detail, it should be understood that various changes, substitutions and alterations can be made therein without departing from the spirit and scope of the invention as defined by the appended claims.

The description is thus to be regarded as illustrative instead of limiting.

What is claimed is:

1. A laminated roofing shingle comprising:
a base layer having a top surface, a bottom surface, and a first edge;
mineral granules from a first color group adhered to the top surface of the base layer in a first area between the first edge and a first boundary parallel to and at a first distance from the first edge;
mineral granules from a second color group adhered to the top surface of the base layer in a second area between the first boundary and a second boundary parallel to and at a second distance from the first edge, the second color group being visually distinct from the first color group;
an overlay layer having a top surface, a bottom surface, and a second edge, the overlay layer providing a plurality of tabs extending from the second edge and having a tab width that defines a portion of the laminated roofing shingle that is exposed in an installed configuration, the plurality of tabs spaced apart to define a plurality of openings between the plurality of tabs;
mineral granules from a third color group adhered to the top surface of the overlay layer on the plurality of tabs in a third area between the second edge and a third boundary parallel to and at the first distance from the second edge, the third color group being visually distinct from the first and second color groups;
mineral granules from the second color group adhered to the top surface of the overlay layer on the plurality of tabs in a fourth area between the third boundary and a fourth boundary parallel to and at the second distance from the second edge;
wherein the first distance between 90% and 97% of the second distance;
wherein the top surface of the base layer is attached to the bottom surface of the overlay layer to form the laminated roofing shingle having a shingle length and a shingle width, the first edge being aligned with the second edge, portions of the top surface of the base layer being exposed through the plurality of openings between the plurality of tabs.

2. The laminated roofing shingle of claim 1 wherein mineral granules from the second color group are darker in color than mineral granules from the first color group and the third color group.

3. The laminated roofing shingle of claim 1 wherein mineral granules from the first color group are darker in color than mineral granules from the third color group.

4. The laminated roofing shingle of claim 1 wherein the second distance is equal to the tab width.

5. The laminated roofing shingle of claim 1 wherein mineral granules from the second color group are relatively uniform in color.

6. The laminated roofing shingle of claim 5 wherein mineral granules from at least one of the first color group and the third color group provide a color gradation.

7. The laminated roofing shingle of claim 1, wherein the overlay layer has a length equal to the shingle length and a width equal to the shingle width.

8. The laminated roofing shingle of claim 7, wherein the base layer has a length equal to the shingle length and a width that is less than one-half the shingle width.

9. A method of making a laminated roofing shingle, the method comprising:
adhering mineral granules from a first color group to a top surface of a sheet between a first boundary and a second boundary spaced apart by a first distance, the sheet having two parallel edges and the first and second boundaries being parallel to the edges;
adhering mineral granules from a second color group to the top surface of the sheet between the second boundary and a third boundary at a second distance from the first boundary and parallel to the edges, the second color group being visually distinct from the first color group, the first distance being between 90% and 97% of the second distance;
adhering mineral granules from a third color group to the top surface of the sheet between a fourth boundary and a fifth boundary spaced apart by the first distance and parallel to the edges, the third color group being visually distinct from the first and second color groups;
adhering mineral granules from the second color group to the top surface of the sheet between the fifth boundary and a sixth boundary at the second distance from the fifth boundary and parallel to the edges;
cutting a base layer from the sheet, the base layer having a first edge at the first boundary;

cutting an overlay layer from the sheet, the overlay layer having a second edge at the fourth boundary and providing a plurality of tabs extending from the fourth boundary to the sixth boundary and having a tab width that defines a portion of the laminated roofing shingle that is exposed in an installed configuration, the plurality of tabs spaced apart to define a plurality of openings between the plurality of tabs;

attaching a top surface of the base layer to a bottom surface of the overlay layer to form the laminated roofing shingle having a shingle length and a shingle width, portions of the mineral granules from the first and second color groups being exposed through the plurality of openings between the plurality of tabs.

10. The method of claim 9 wherein mineral granules from the second color group are darker in color than mineral granules from the first color group and the third color group.

11. The method of claim 9 wherein mineral granules from the first color group are darker in color than mineral granules from the third color group.

12. The method of claim 9 wherein the second distance is equal to the tab width.

13. The method of claim 9 wherein mineral granules from the second color group are relatively uniform in color.

14. The method of claim 13 wherein mineral granules from at least one of the first color group and the third color group provide a color gradation.

15. The method of claim 9, wherein the overlay layer has a length equal to the shingle length and a width equal to the shingle width.

16. The method of claim 15, wherein the base layer has a length equal to the shingle length and a width that is less than one-half the shingle width.

* * * * *